UNITED STATES PATENT OFFICE.

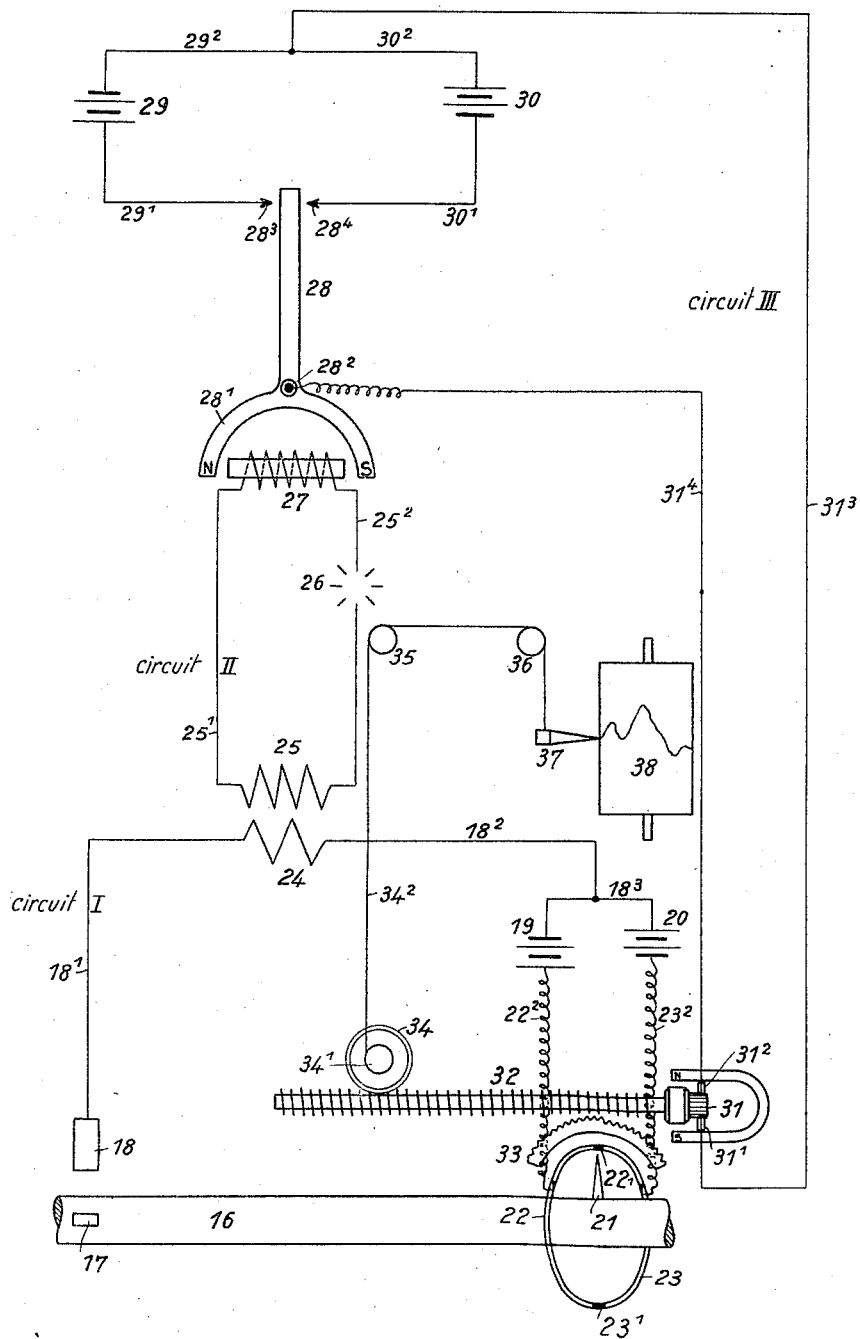

FRITZ LUX, OF LUDWIGSHAFEN-ON-THE-RHINE, GERMANY.

ELECTRIC DYNAMOMETER.

1,067,995.  Specification of Letters Patent.  Patented July 22, 1913.

Application filed November 21, 1911. Serial No. 661,581.

*To all whom it may concern:*

Be it known that I, FRITZ LUX, a subject of the King of Bavaria, residing at Ludwigshafen-on-the-Rhine, in the Empire of Germany, have invented a new and useful Electric Dynamometer, of which the following is a specification.

My invention relates to an electric dynamometer adapted to indicate the so-called angle of torsion of some shaft transmitting power from one point to another in its length, the said angle being the angle through which the section of the shaft at the other point is displaced or distorted relatively to the section at the first point, the assumption being, that the power transmitted be proportionate to the angle of torsion per unit of length. The angle of torsion of the shaft is according to my invention electrically measured in such a manner, that on a suitable place of the shaft, for example at one end, an electric device is momentarily actuated at each revolution of the shaft and that the effect of this device is made to appear on another place of the shaft, for example at its other end whereby the angle of torsion of the shaft may be read off a suitably indicating device.

In the accompanying drawing, which diagrammatically illustrates a dynamometer embodying my invention, 16 is the shaft, the angle of torsion of which is to be measured. It carries a contact piece 17, which on every revolution of the shaft 16 contacts with a brush. The shaft 16 is moreover provided with a contact brush 21, which is adapted to ride on the inside of a ring divided by two opposite insulations $22^1$ and $23^1$ into two segments 22 and 23. The two segments are connected with and insulated from a toothed segment 33, and all these parts are so guided in a frame (not shown), that they can turn in either direction around the shaft 16. The two segments 22 and 23 are electrically and elastically connected by means of two helical springs $22^2$ and $23^2$ with two batteries 19 and 20, which are connected together by a line $18^3$ and with the contact brush 18 by means of line $18^2$, $18^1$ and the primary coil 24 of an induction coil, the secondary coil of which is denoted by 25. The two batteries 19 and 20 are so disposed, that one 19 of them can send a current in one direction through the primary circuit (denoted by I), in case the contact brush 21 rubs on the inside of the segment 22 and the circuit is momentarily closed by the contact piece 17 coming in contact with the contact brush 18, while the other battery 20 can send a current in the opposite direction through the primary circuit, in case the contact brush 21 rubs on the inside of the segment 23 and the circuit is in the described manner momentarily closed.

31 denotes a polarized electromotor the armature of which is connected with a screw spindle 32 that meshes with the toothed segment 33 and also with a worm wheel 34, the parts 32 and 34 being mounted to turn with their pivots in suitable bearings (not shown). The worm wheel 34 is rigidly connected with a drum $34^1$, on which one end of a rope $34^2$ or its equivalent is fastened. The rope $34^2$ passes over suitable guiding pulleys 35 and 36 and its other end carries a pencil 37, which in any approved manner is guided along a drum 38, that forms part of some known clockwork (not shown).

The secondary coil 25 is connected with an electromagnet 27 by lines $25^1$, $25^2$, in one of which a spark gap 26 is inserted. The parts 25, $25^1$, 27, $25^2$, 26 form a secondary circuit, which is denoted by II. The core of the electromagnet 27 is adapted to attract either the marked pole N and to repulse the unmarked pole S of a horse-shoe magnet $28^1$ rocking at $28^2$ or vice versa. The horse-shoe magnet $28^1$ is rigidly connected with an arm 28 which moves between two contact pieces $28^3$ and $28^4$, that are connected by lines $29^1$, $30^1$ with two batteries 29, 30. The latter are in turn connected together by lines $29^2$, $30^2$ and with one contact brush $31^1$ of the electromotor 31 by means of a line $31^3$. The other contact brush $31^2$ of the electromotor 31 is connected by means of a line $31^4$ with the fulcrum $28^2$ of the arm 28. The parts 31, $31^1$, $31^3$, 28, $28^2$, $31^4$, $31^2$ form a third circuit denoted by III. One battery 29 is adapted to send its current in one direction through the circuit III in case the arm 28 is in contact with the contact piece $28^3$, while the other battery 30 is adapted to send its current in the opposite direction through the said circuit, in case the arm 28 is in contact with the other contact piece $28^4$.

When the rotating shaft 16 is under no load, normally the contact brush 21 will be in contact with one insulation $22^1$ or $23^1$ at the moment that the contact piece 17 comes in contact with the contact brush 18, so that no current can circulate in the primary circuit I. When, however, a load is put on the shaft 16 or when the load is increased, the contact brush 21 will get behind, so that it will remain in contact with say the segment 22 at the moment that the contact piece 17 comes in contact with the contact brush 18. The consequence of this will be, that the battery 19 sends an impulse in one direction through the primary coil 24, which produces in the secondary coil 25 induction currents of high tension and the spark gap 26 permits only the strong current at opening to pass through the electromagnet 27, while the weak current at closing is stopped. The core of the electromagnet 27 will therefore turn by means of the horse-shoe magnet $28^1$ the arm 28 in one direction, so that this arm comes in contact with say the contact piece $28^4$ and the battery 30 sends its current through the circuit III in such a direction, that the armature of the polarized electromotor 31 is turned in that direction in which the screw spindle 32 by means of the toothed segment 33 so turns the ring 22, 23 as to move one insulation $22^1$ or $23^1$ over the contact brush 21 at the moment that the contact piece 17 comes in contact with the contact brush 18. It may be, that the shaft 16 will have to make several revolutions and the armature of the electromotor 31 in consequence is actuated momentarily several times, before the said effect is completely attained. If the load on the shaft 16 is diminished, of course the free end of the contact brush 21 will be on the other side of either insulation $22^1$ or $23^1$ at the moment that the primary circuit I is closed, so that the other battery 20 will circulate its current in the opposite direction and consequently the energized electromagnet 27 in the secondary circuit II will turn the arm 28 in the opposite direction and the other battery 29 now inserted will circulate its current in the third circuit III in the opposite direction for turning the armature of the electromotor 31 with the screw spindle 32 in the opposite direction. The varying motion of the screw spindle 32 is at the same time transmitted by means of the worm wheel 34, the drum $34^1$ and the rope $34^2$ to the pencil 37, which draws a diagram line on the slowly rotating drum 38, so that in this manner the variations of the angle of torsion of the shaft 16, in other words the variations of the power transmitted by the shaft 16, are registered.

I claim:

1. In an electric dynamometer of the kind described, the combination with a shaft, of a ring adapted to be guided concentrically with said shaft for turning in either direction and divided by two opposite insulations into two segments, a contact brush on said shaft adapted to rub on said ring, a toothed segment concentric with said shaft and rigidly connected with and insulated from said ring, a screw spindle meshing with said toothed segment, a polarized electromotor having its armature connected with said screw spindle, two batteries connected by lines on the one hand with one another and on the other hand with the two segments in said ring, an induction coil, a primary circuit including a portion of said shaft, said contact brush, said ring, said lines with said two batteries and the primary coil of said induction coil, said two batteries being adapted to severally send a current through said primary circuit in opposite directions, a contact piece on said shaft at a distance from said contact brush adapted to momentarily close said primary circuit, an electric device, a secondary circuit having a spark gap and including said electric device and the secondary coil of said induction coil and means operated from said electric device for sending a current in one or the other direction through said polarized electromotor.

2. In an electric dynamometer of the kind described, the combination with a shaft, of a ring adapted to be guided concentrically with said shaft for turning in either direction and divided by two opposite insulations into two segments, a contact brush on said shaft adapted to rub on said ring, a toothed segment concentric with said shaft and rigidly connected with and insulated from said ring, a screw spindle meshing with said toothed segment, a polarized electromotor having its armature connected with said screw spindle, two batteries connected by lines on the one hand with one another and on the other hand with the two segments in said ring, an induction coil, a primary circuit including a portion of said shaft, said contact brush, said ring, said lines with said two batteries and the primary coil of said induction coil, said two batteries being adapted to severally send a current through said primary circuit in opposite directions, a contact piece on said shaft at a distance from said contact brush adapted to momentarily close said primary circuit, an electric device, a secondary circuit having a spark gap and including said electric device and the secondary coil of said induction coil, means operated from said electric device for sending a current in one or the other direction through said polarized electro-motor, a worm wheel meshing with said screw spindle, a drum adapted to be slowly and uniformly rotated, a pencil adapted to draw a diagram line on said drum, and means operated from said worm wheel for moving said pencil.

FRITZ LUX.

Witnesses:
A. O. TITTMANN,
EDUARD PEITZ.

Copies of this patent may be obtained for five cents each, by addressing the "Commissioner of Patents, Washington, D. C."